United States Patent
Huang et al.

(10) Patent No.: US 12,457,503 B2
(45) Date of Patent: Oct. 28, 2025

(54) SPECTRUM SHARING BETWEEN NETWORKS

(71) Applicant: QUALCOMM Incorporated, San Diego, CA (US)

(72) Inventors: Yi Huang, San Diego, CA (US); Xiao Feng Wang, San Diego, CA (US); Xipeng Zhu, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 804 days.

(21) Appl. No.: 17/807,561

(22) Filed: Jun. 17, 2022

(65) Prior Publication Data

US 2023/0413064 A1 Dec. 21, 2023

(51) Int. Cl.
*H04W 16/14* (2009.01)
*H04W 72/0453* (2023.01)
*H04W 84/06* (2009.01)

(52) U.S. Cl.
CPC ....... *H04W 16/14* (2013.01); *H04W 72/0453* (2013.01); *H04W 84/06* (2013.01)

(58) Field of Classification Search
CPC . H04W 16/14; H04W 72/0453; H04W 84/06; H04W 16/02
See application file for complete search history.

(56) References Cited

U.S. PATENT DOCUMENTS

| 7,627,324 B2 * | 12/2009 | Heubel ................ H04W 16/14 |
| | | 455/444 |
| 2015/0079977 A1 | 3/2015 | Park et al. |
| 2015/0188644 A1 | 7/2015 | Kang et al. |
| 2019/0239082 A1 | 8/2019 | Ravishankar |

FOREIGN PATENT DOCUMENTS

| EP | 4207902 A1 | 7/2023 |
| WO | 2022044729 A1 | 3/2022 |

OTHER PUBLICATIONS

Gopal R., et al., "Framework for Unifying 5G and Next Generation Satellite Communications", IEEE Network., vol. 32, No. 5, Sep. 1, 2018 (Sep. 1, 2018), pp. 16-24, XP055839431, US, ISSN: 0890-8044, DOI: 10.1109/MNET.2018.1800045, the whole document.
International Search Report and Written Opinion—PCT/US2023/023900—ISA/EPO—Aug. 3, 2023.

* cited by examiner

*Primary Examiner* — Ashley Shivers
(74) *Attorney, Agent, or Firm* — Patterson & Sheridan LLP

(57) ABSTRACT

Certain aspects of the present disclosure provide techniques for wireless communication by a first network entity of a first network of a first network operator. A method includes receiving, from a second network entity of a second network of a second network operator, frequency allocation information indicating a first allocation pattern identifying, for each of at least one cell, a corresponding frequency channel band of a frequency band spanning a plurality of frequency channel bands, wherein the first allocation pattern identifies a first frequency channel band of the plurality of frequency channel bands for a first cell of the at least one cell; and sending an indication to at least a first user equipment (UE) indicating to communicate in the first cell using a second frequency channel band of the plurality of frequency channel bands that is different than the first frequency channel band.

30 Claims, 11 Drawing Sheets

SPECTRUM SHARING BETWEEN NETWORKS

BACKGROUND

Field of the Disclosure

Aspects of the present disclosure relate to wireless communications, and more particularly, to techniques for spectrum sharing between networks.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

In certain aspects, a terrestrial network and a non-terrestrial network (NTN) may be configured to operate in the same frequency spectrum range, such as from 6 GHz to 24 GHz (e.g., referred to as FR3). For example, a terrestrial network may be configured to communicate in FR3, and a NTN may operate in a frequency range (e.g., 0.5 GHz to 100 GHz) that includes FR3.

Accordingly, in certain aspects two networks (e.g., operated by different network operators) in the same area may share the same frequency spectrum range (e.g., FR3). Accordingly, aspects herein relate to complementary frequency spectrum sharing between networks. Such complementary frequency spectrum sharing allows devices in the two networks to communicate in their respective network without interfering with the other network. Therefore, more networks can be operated in the same geographic area without requiring different frequency bands to be allocated for the different networks.

One aspect provides a method for wireless communication by a first network entity of a first network of a first network operator. The method includes receiving, from a second network entity of a second network of a second network operator, frequency allocation information indicating a first allocation pattern identifying, for each of a at least one cell, a corresponding frequency channel band of a frequency band spanning a plurality of frequency channel bands, wherein the first allocation pattern identifies a first frequency channel band of the plurality of frequency channel bands for a first cell of the at least one cell; and sending an indication to at least a first user equipment (UE) indicating to communicate in the first cell using a second frequency channel band of the plurality of frequency channel bands that is different than the first frequency channel band.

Another aspect provides a method for wireless communication by a first network entity of a first network of a first network operator. The method includes sending, to a second network entity of a second network of a second network operator, frequency allocation information indicating a first allocation pattern identifying, for each of at least one beam of the first network, a corresponding frequency channel band of a frequency band spanning a plurality of frequency channel bands, wherein the first allocation pattern identifies a first frequency channel band of the plurality of frequency channel bands for a first beam of the at least one beam; and sending an indication to at least a first UE indicating to communicate in the first beam using the first frequency channel band.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
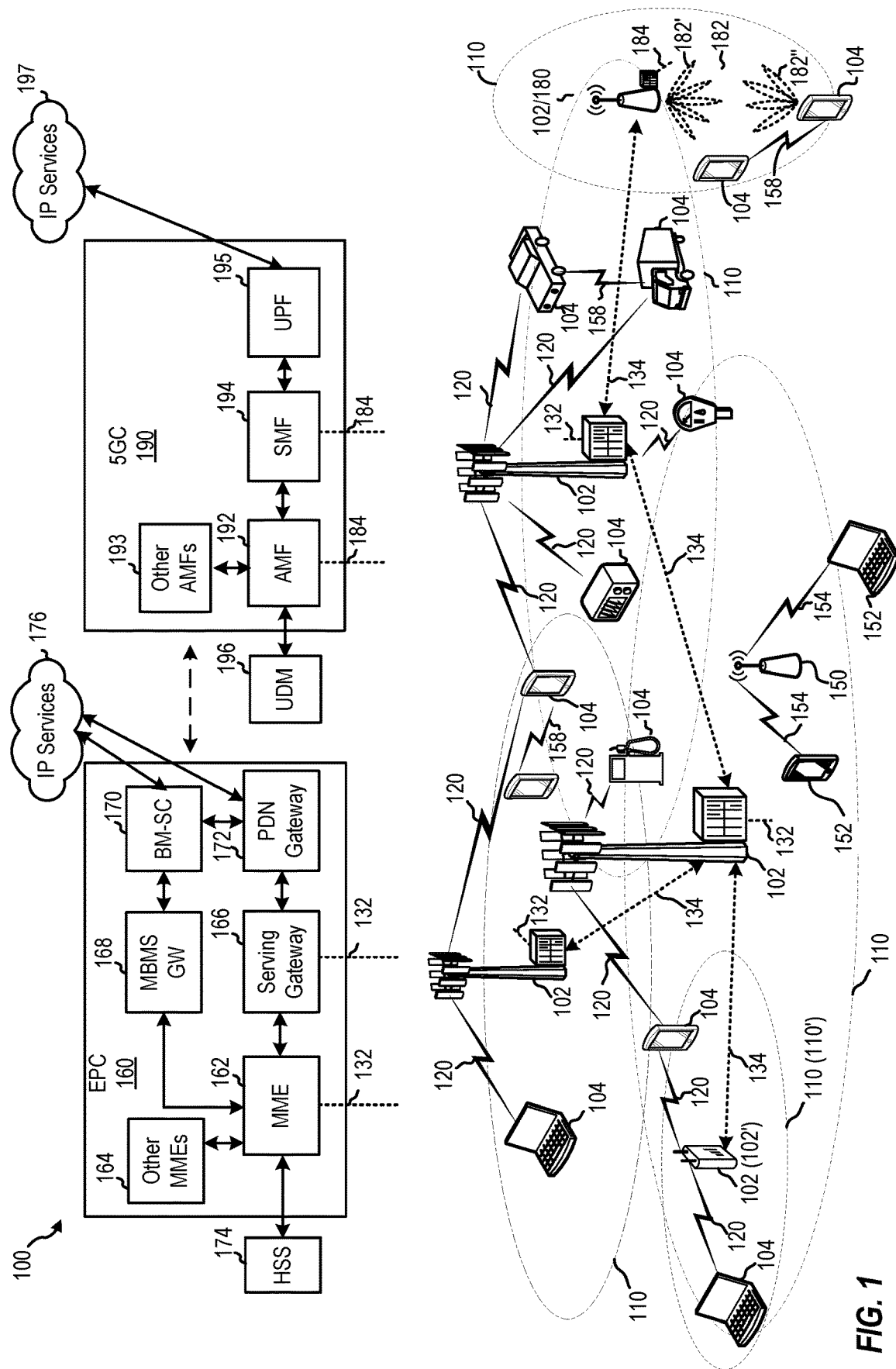
FIG. 1 depicts an example wireless communications network.

Aspects of the present disclosure provide apparatuses, methods, processing systems, and computer-readable mediums for spectrum sharing between networks, such as between a non-terrestrial network (NTN) and a terrestrial network. Though certain aspects are described with respect to spectrum sharing between a NTN and a terrestrial network, it should be noted that the aspects herein may be applicable to spectrum sharing between other types of networks, the same type of networks, networks operated by the same or different operators, etc.

In wireless communications systems, different network operators may provide coverage in the same geographical location. For example, a first network operator may operate a first network, the coverage of which at least partially overlaps with the coverage of a second network operated by a second network operator. In one example, the overlap in network coverage by different network operators occurs between a NTN (e.g., satellite-based networks) and a terrestrial network.

In certain aspects, a terrestrial network and a non-terrestrial network may be configured to operate in the same frequency spectrum range, such as from 6 GHz to 24 GHz (e.g., referred to as FR3). For example, a terrestrial network may be configured to communicate in FR3, and a NTN may operate in a frequency range (e.g., 0.5 GHz to 100 GHz) that includes FR3.

Accordingly, in certain aspects two networks (e.g., operated by different network operators) in the same area may share the same frequency spectrum range (e.g., FR3). Accordingly, aspects herein relate to complementary frequency spectrum sharing between networks. Such complementary frequency spectrum sharing allows devices in the two networks to communicate in their respective network without interfering with the other network. Therefore, more networks can be operated in the same geographic area without requiring different frequency bands to be allocated for the different networks.

In complementary frequency spectrum sharing, different portions of a frequency spectrum range (e.g., including a contiguous range of frequencies) may be allocated to different networks in the same geographical area (e.g., cell). For example, a frequency spectrum range may be divided into a plurality of frequency bands (e.g., a FR3 band may have a 200 MHz bandwidth). Each frequency band may be a contiguous subset of frequencies of the frequency spectrum. Different networks may share a frequency band, such as by further dividing the frequency band into a plurality of frequency channel bands (FCBs). In some aspects, each FCB is a contiguous subset of frequencies of the frequency band. Accordingly, different FCBs may be allocated to different networks in the same geographical area to allow for frequency spectrum sharing.

Certain aspects herein provide techniques for a first network to communicate, to a second network, information indicating what FCBs the first network uses for communication in each of a plurality of geographical areas (e.g., cells). Accordingly, the second network can avoid using the same FCB in the same geographic area as the first network, to avoid interference between the first network and the second network. In certain aspects, a first network entity (e.g., base station (BS), central network entity, etc.) of the first network communicates the information to a second network entity of the second network, such as directly or indirectly (e.g., via a database, such as a third party database). The communication between the first network entity and the second network entity may be wired and/or wireless.

In certain aspects, a NTN entity of a NTN communicates the information indicating its FCB allocation to a terrestrial network (TN) entity of a terrestrial network. When communicating on a downlink, such as with user equipments (UEs), a base station (BS) of the NTN (referred to as a NTNBS) may transmit signals as a plurality of beams, where each beam covers a given geographical area. Further, when communicating on a downlink, a BS of a terrestrial network (referred to as a TNBS) may transmit signals in a geographical area referred to as a cell. In certain aspects, each beam of the NTNBS is associated with a corresponding FCB used for transmitting signals using the beam. Accordingly, in certain aspects, the NTN entity communicates information to the TN entity indicating the FCB allocation of each beam of a NTNBS. The information may further indicate a geographical location covered by each beam. The TN entity can then determine which cells (e.g., associated with one or more TNBSs) overlap with which beams. Where one or more beams overlap with a cell, the TN entity can allocate to the TNBS of the cell a different FCB than the one or more FCBs used by the NTNBS in the one or more beams. Accordingly, the TNBSs of the TN and the NTNBSs of the NTN will not use the same FCB in the same geographical location, thereby avoiding interference.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
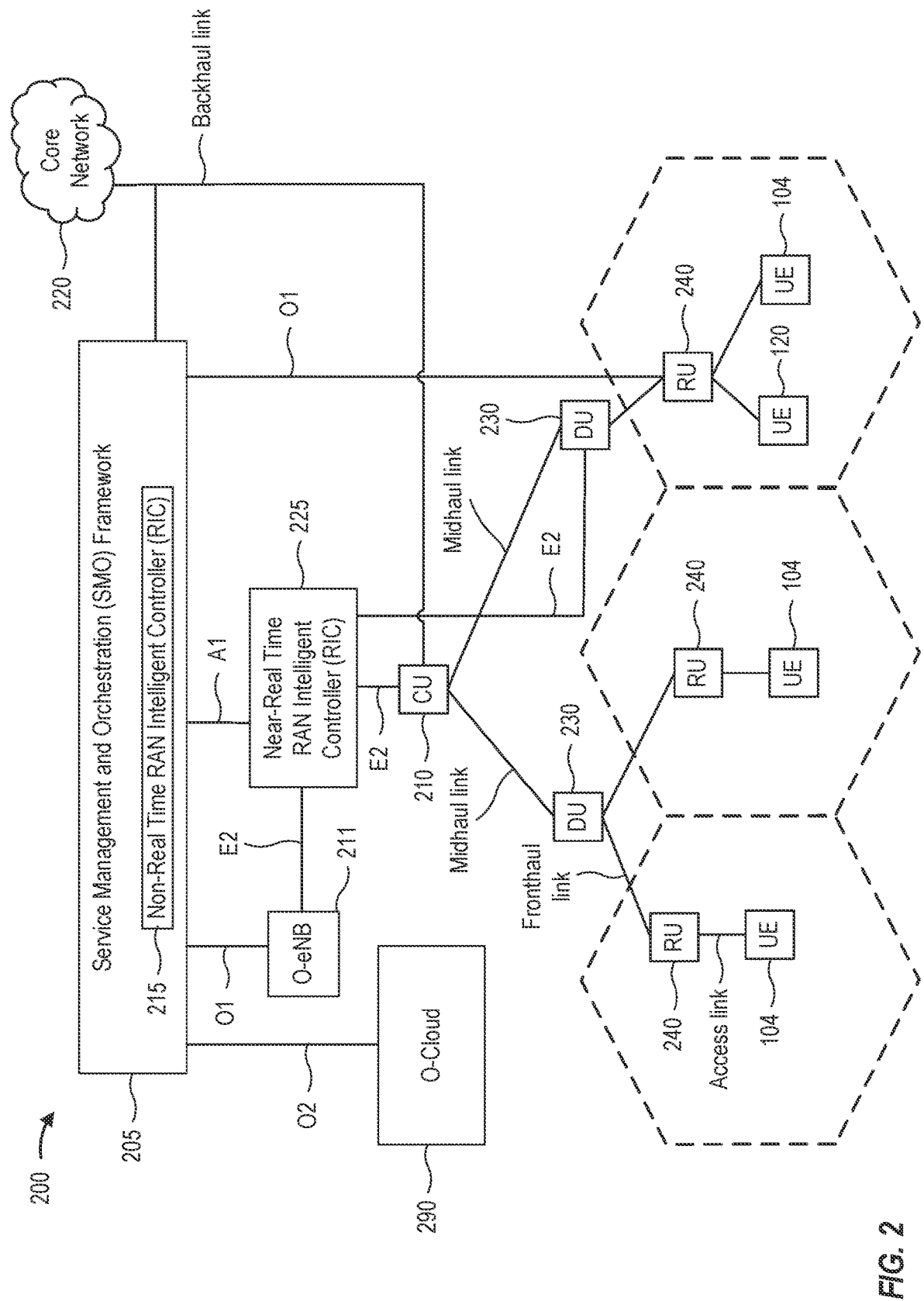
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BS s 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
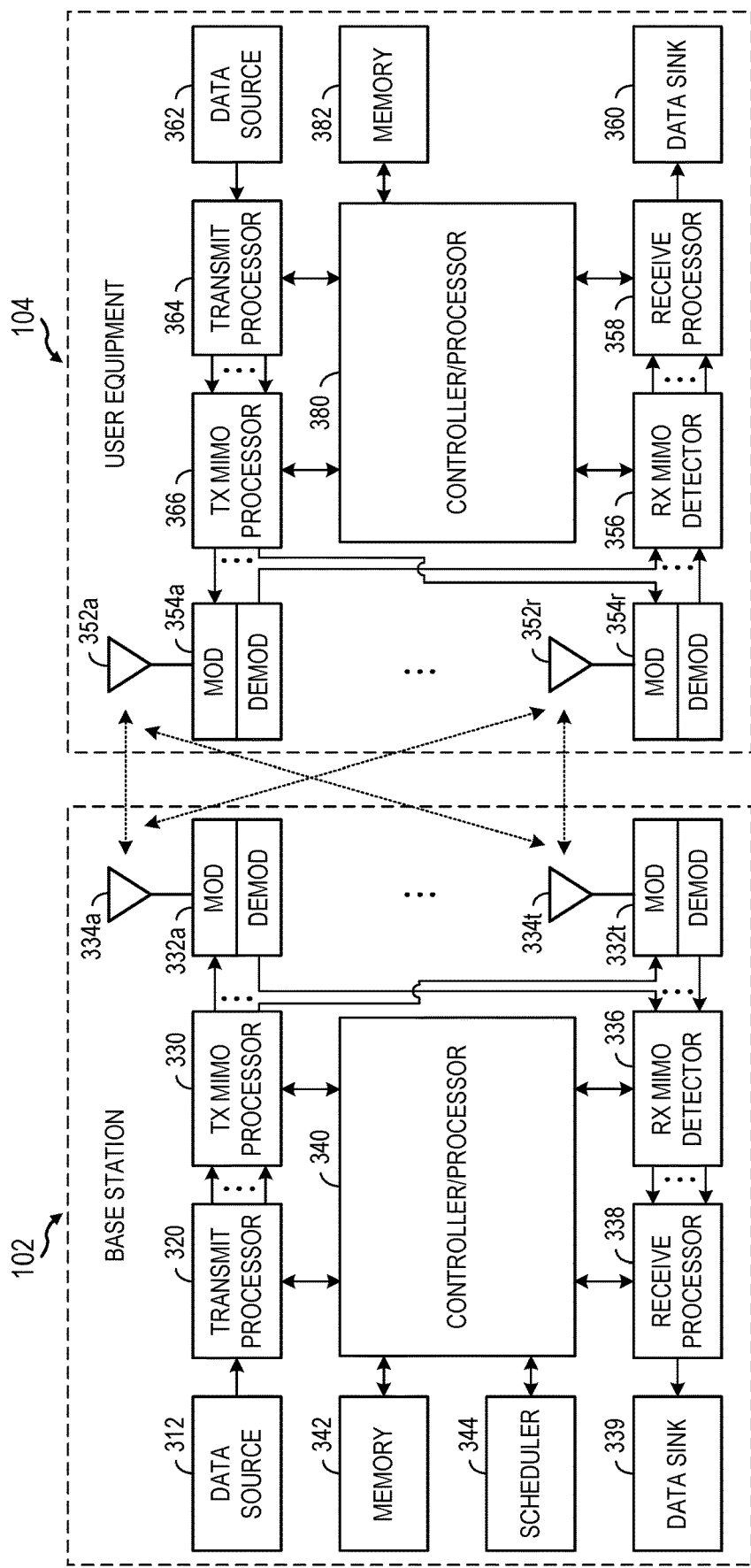
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
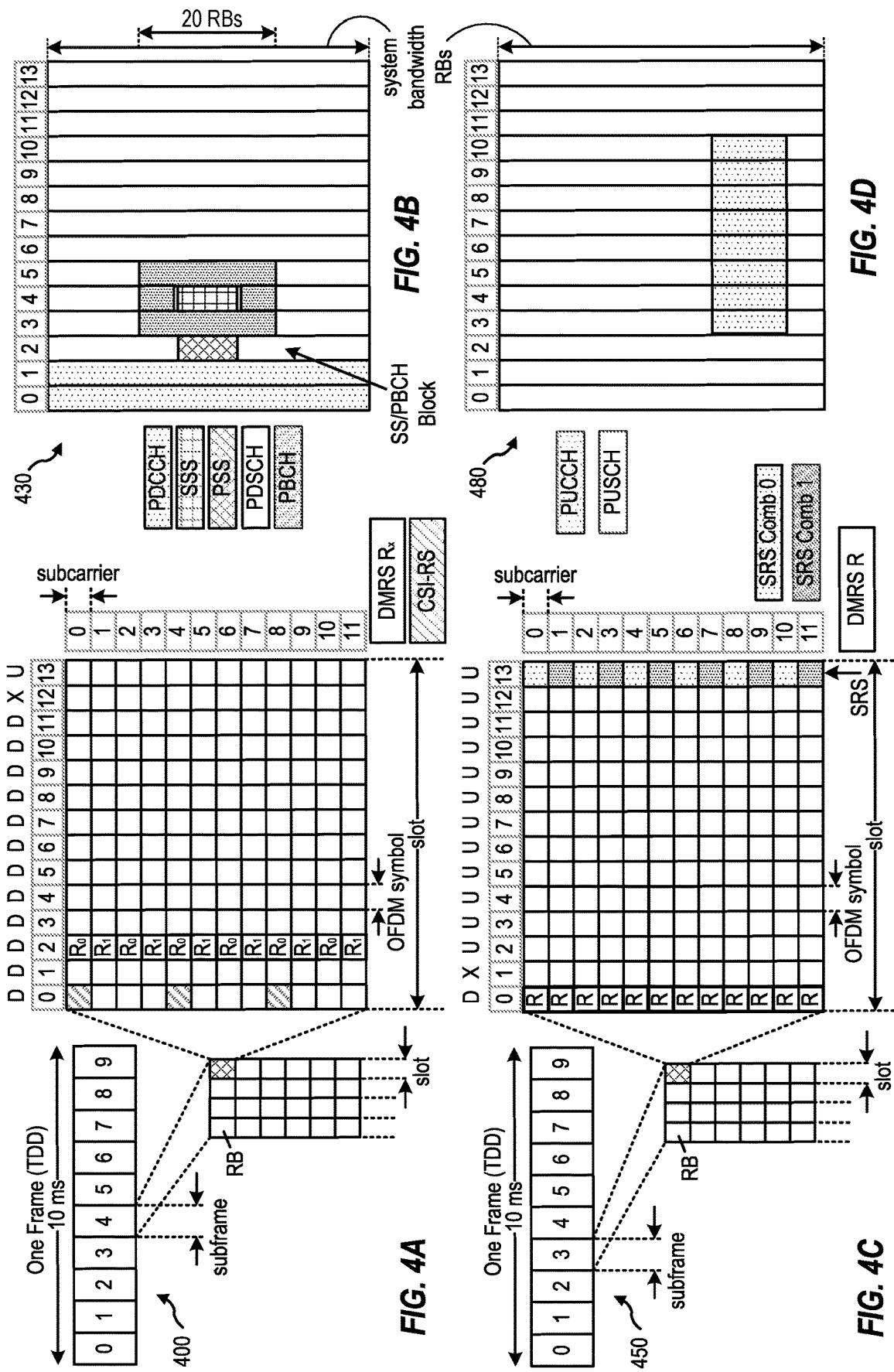
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Non-Terrestrial Networks

In some cases, communication in a wireless communication network, such as the wireless communication network 100 illustrated in FIG. 1, may be facilitated by one or more non-terrestrial (NT) devices. In such cases, this wireless communication network may be referred to as a NT network (NTN). NT devices may include, for example, devices such as a space satellite, a balloon, a dirigible, an airplane, a drone, an unmanned aerial vehicle, and/or the like, which may operate as a BS 102.

Figure 5:
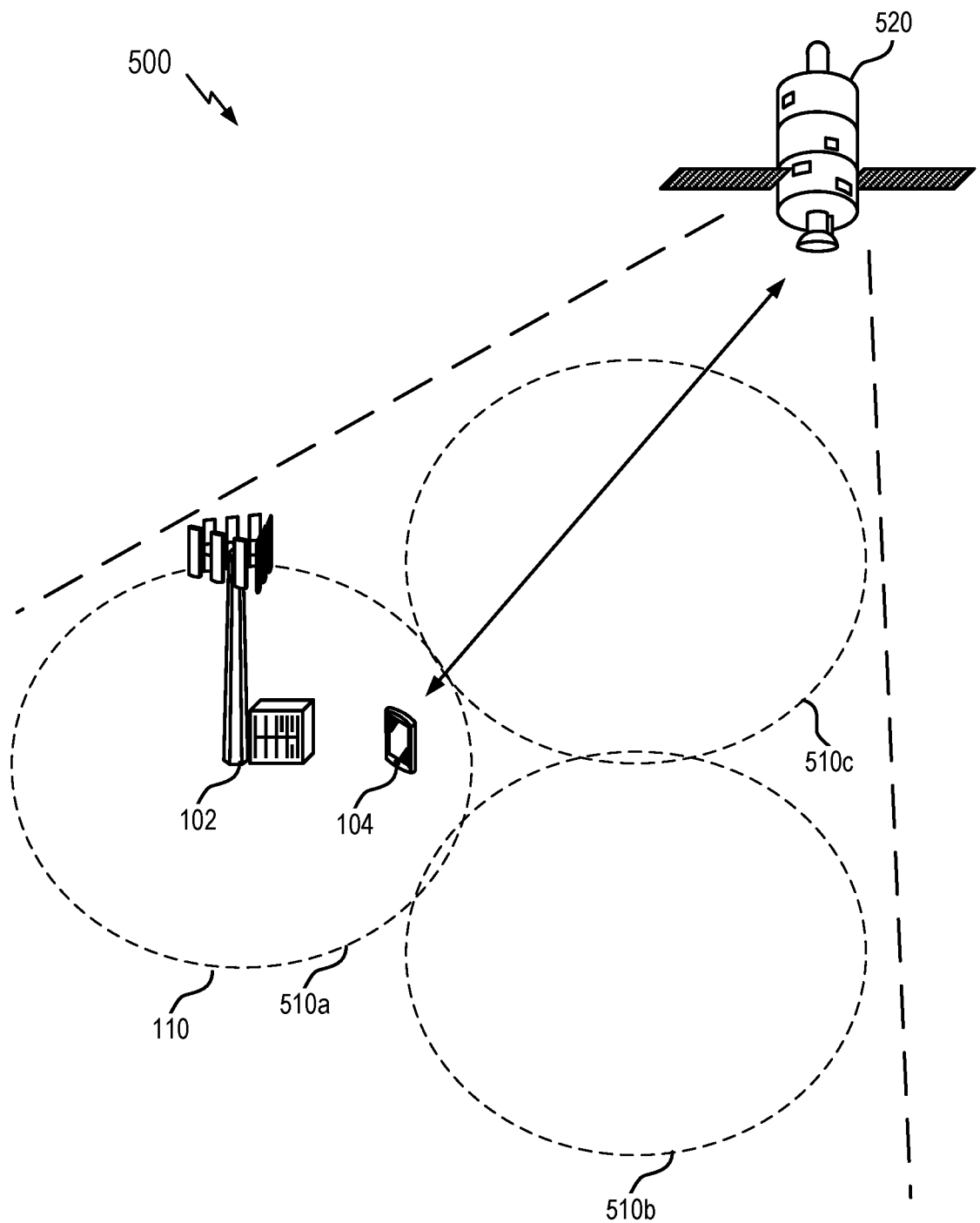
FIG. 5 illustrates an example of a non-terrestrial network (NTN) including a satellite as a non-terrestrial network base station (NTNBS), which may operate like a base station (BS) discussed with respect to FIG. 1.

FIG. 5 illustrates an example of a NTN 500 including a satellite as a NTNBS 520, which may operate like a BS 102 discussed with respect to FIG. 1. In some examples, the NTN 500 may implement similar aspects as wireless communication network 100.

In an example, the NTNBS 520 communicates with UE 104, such as by providing coverage for NTN 500. For example, as discussed, NTNBS 520 may transmit using a plurality of beams, each beam covering a geographical area 510, which may be referred to as a coverage area of the beam. FIG. 5 illustrates NTNBS 520 transmitting using three beams that cover three geographical areas 510a-c. However, it should be noted that NTNBS 520 may transmit using fewer or greater number of beams. Further, different beams may cover the same size or different sizes of geographical area.

In certain aspects, NTNBS 520 uses different FCBs for beams that cover adjacent coverage areas, to avoid interference between devices that are near the edges of adjacent coverage areas. In certain aspects, UE 104 uses the same FCB for uplink communication as the NTNBS 520 uses for downlink communication when in the coverage area of the beam using the FCB. In certain aspects, different FCBs may be used for uplink and downlink communication.

In certain aspects, UE 104 communicates directly with NTNBS 520, and NTNBS 520 may communicate with other network entities of NTN 500, such as via a gateway and/or another NT device.

As shown, a BS 102 of a TN, such as an embodiment of wireless communication network 100, provides coverage in a cell 110 that overlaps with one or more coverage areas of one or more beams of NTNBS 520. As shown, cell 110 completely overlaps with coverage area 510a. However, it should be noted that cell 110 may only partially overlap with a coverage area of NTNBS 520. Further, it should be noted that cell 110 may partially and/or fully overlap with multiple coverage areas of NTNBS 520.

In certain aspects, BS 102 can communicate with a UE 104 in cell 110 using a FCB on a downlink. In certain aspects, the UE 104 uses the same FCB for uplink communication as the BS 102 uses for downlink communication when in the cell 110. In certain aspects, different FCBs may be used for uplink and downlink communication.

As discussed, a network entity of NTN 500 (e.g., NTNBS 520 or another network entity) may communicate with a network entity of network 100 (e.g., BS 102 or another network entity) FCB allocation information of the beams of NTNBS 520. Accordingly, the network entity of network 100 can configure BS 102 to use one or more FCBs in cell 110 that are not used by NTNBS 520 in the same geographical area as cell 110, thereby avoiding interference between NTN 500 and network 100.

Aspects Related to Spectrum Sharing for NTNs and Terrestrial Networks

As discussed, certain aspects herein provide for spectrum sharing for NTNs and terrestrial networks.

Figure 6:
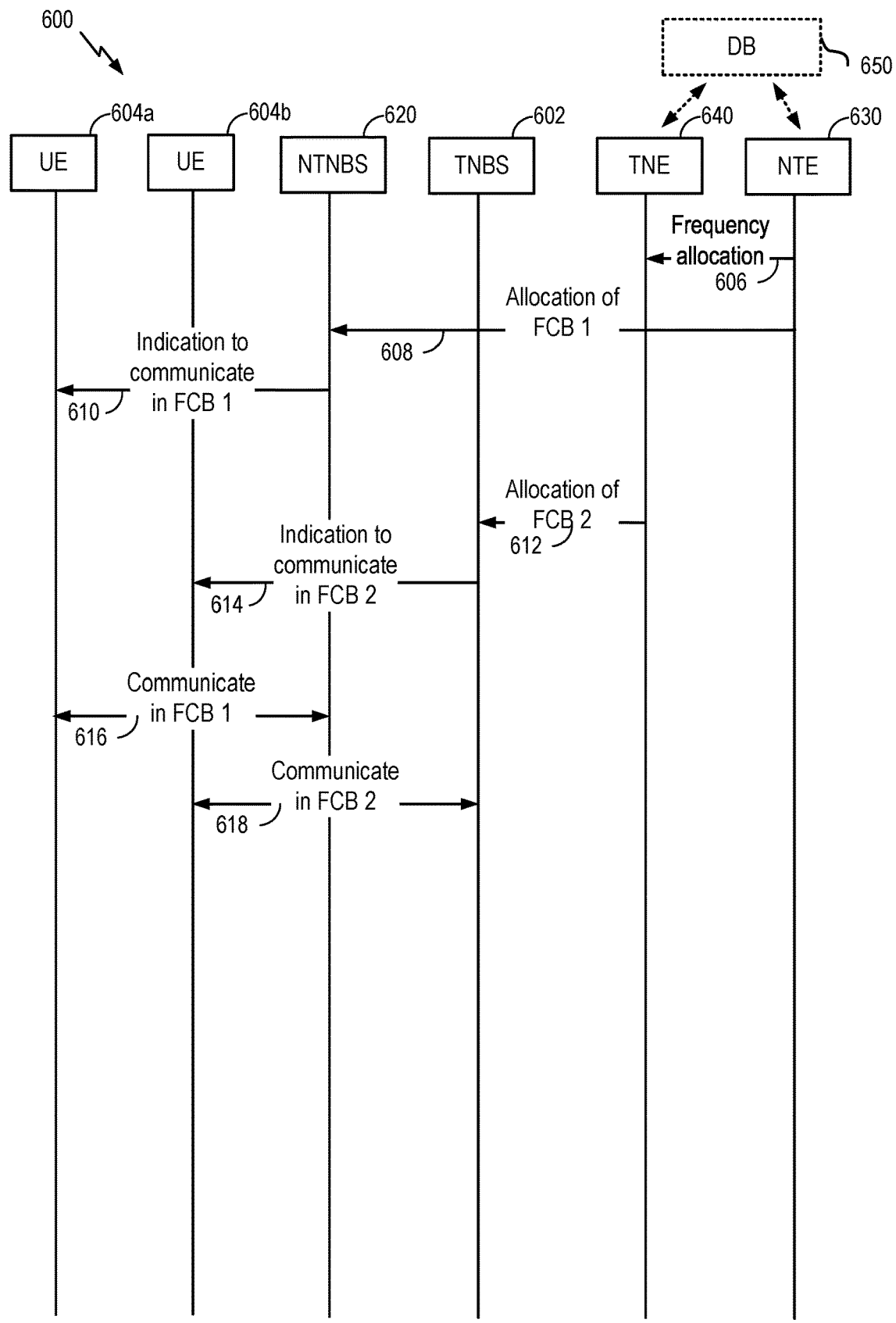
FIG. 6 depicts a process flow for spectrum sharing between a NTN and a terrestrial network (TN).

FIG. 6 depicts a process flow 600 for spectrum sharing between a NTN and a TN. In some aspects, NTNBS 620 is an example of NTNBS 520 depicted and described with respect to FIG. 5, TNBS 602 is an example of BS 102 described with respect to FIG. 1, and UEs 604a and 604b are examples of UE 104 described with respect to FIG. 1. Further, NT entity 630 is an example of a network entity of the NTN, and TN entity 640 is an example of a network entity of the TN. In certain aspects, NT entity 630 is a separate device from NTNBS 620. In certain aspects, NT entity 630 is NTNBS 620. In certain aspects, TN entity 640 is a separate device from TNBS 602. In certain aspects, TN entity 640 is TNBS 602. Although FIG. 6 describes two separate UEs, one communicating with NTNBS 620, and another communicating with TNBS 602, it should be noted that in certain aspects a single UE can communicate with both NTNBS 620 and TNBS 602. Accordingly, in certain aspects, a single UE may perform the actions of both UE 604a and UE 604b discussed with respect to FIG. 6.

At 606, NT entity 630 sends to TN entity 640, frequency allocation information. In certain aspects, NT entity 630 sends the frequency allocation information to TN entity 640 directly. In certain aspects, NT entity 630 sends the frequency allocation information to TN entity 640 indirectly, such as via a database 650 (e.g., a third party database controlled by neither the network operator of the NTN nor the TN). For example, NT entity 630 may store the frequency allocation information in database 650, and TN entity 640 may retrieve the frequency allocation information from database 650. The frequency allocation information may indicate information regarding which FCBs are used in which geographic locations in the NTN, as discussed further herein. In certain aspects, the frequency allocation information indicates a first allocation pattern, as discussed further herein. In certain aspects, the first allocation pattern identifies, for each of a plurality of beams of the NTNBS 620, a corresponding one or more FCBs. For example, the first allocation pattern may identify a first FCB for a first beam of the plurality of beams.

In certain aspects, the frequency allocation information includes an index value that maps to the first allocation pattern, wherein a plurality of index values map to a plurality of different allocation patterns.

At 608, NT entity 630 sends to NTNBS 620 an indication to use one or more FCBs for one or more beams of NTNBS 620. For example, in certain aspects, the indication indicates to use the first FCB for the first beam of the NTNBS 620.

At 610, NTNBS 620 indicates to UE 604a, which may be a UE in the coverage area of the first beam of NTNBS 620, an indication to use the first FCB for communication.

At 612, TN entity 640 sends to TNBS 602 an indication to use one or more FCBs for one or more cells of TNBS 602. For example, in certain aspects, the indication indicates to use a different FCB (e.g., a second FCB) than the first FCB for a first cell based on the first cell overlapping in coverage area with the first beam. For example, the TN entity 640, based on receiving the frequency allocation information at 606 from NT entity 630, may determine that the first cell of TNBS 602 overlaps in coverage area with the first beam of NTNBS 620. Further, the TN entity 640 may determine that the first FCB is used by NTNBS 620 for communication over the first beam. Accordingly, to avoid interference with the NTN communications, the TN entity 640 may determine to use a different FCB than the first FCB for communication in the first cell (e.g., and different than any other FCBs that NT entity 630 may indicate as used in beams that overlap with the first cell). Since the first cell overlaps in coverage area with the first beam, the frequency allocation information may also be referred to as indicating that NTNBS 620 uses the first FCB for communication in the first cell.

At 614, TNBS 602 indicates to UE 604b, which may be a UE in the coverage area of the first cell of TNBS 602, an indication to use the second FCB for communication.

At 616, UE 604a communicates (e.g., receives downlink signals) with NTNBS 620 using the first FCB indicated by NTNBS 620. At 618, UE 604b communicates (e.g., receives downlink signals) with TNBS 602 using the second FCB indicated by TNBS 602.

Aspects Related to Frequency Channel Bands and Allocation Patterns

Figure 7A:
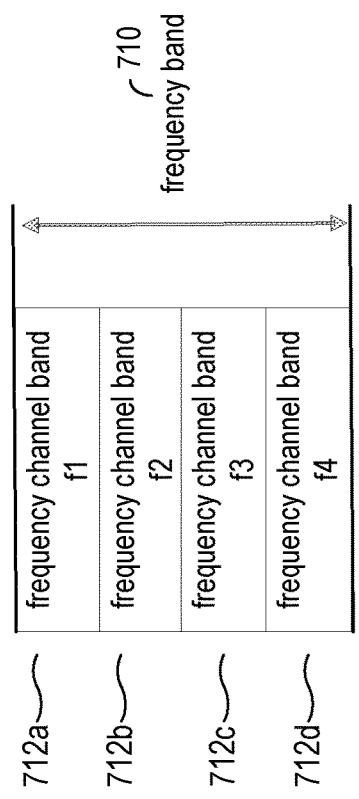
FIG. 7A illustrates an example frequency band spanning a plurality of example frequency channel bands (FCBs.

FIG. 7A illustrates an example frequency band spanning a plurality of example FCBs. Although the depiction includes four distinct FCBs, fewer or more FCBs can be present.

In certain aspects, frequency band 710 is a contiguous subset of the spectrum utilizable by a terrestrial network and a NTN. For example, the spectrum utilizable by a terrestrial network and a NTN can be FR3 (from 6 GHz to 24 GHz) and frequency band 710 can be centered at 8 GHz with 200 MHz bandwidth.

Following the example above, frequency band 710 can be subdivided into distinct, contiguous, non-overlapping FCBs, such as FCBs 712a-d. In some examples, FCBs 712a-d share a same bandwidth, such as of 50 MHz. Alternatively, in some examples, FCBs 712a-d have varying bandwidths.

Figure 7B:
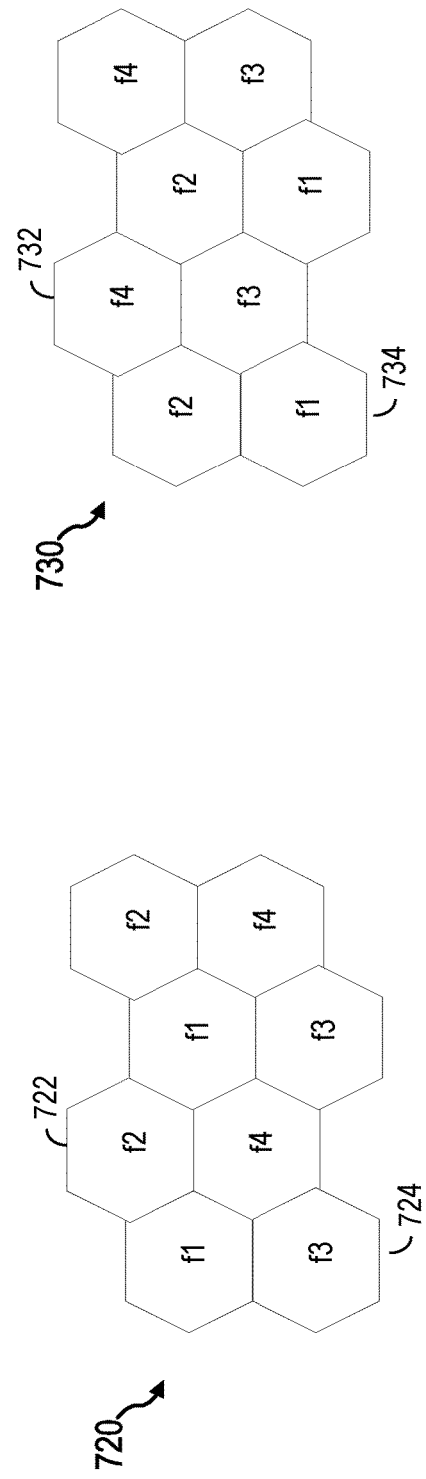
FIG. 7B illustrates two example allocation patterns.

FIG. 7B illustrates two example allocation patterns 720 and 730. Although the depiction includes two distinct allocation patterns, fewer or more allocation patterns can be specified with the format depicted.

For example, the FCBs f1, f2, f3, and f4 can correspond to FCBs 712a-d. For allocation patterns 720 and 730, each hexagon can correspond to the coverage area (e.g., a cell or a coverage area of a beam) of a terrestrial network or a NTN. For example, allocation pattern 720 can be the allocation pattern in a NTN whereas allocation pattern 730 can be the allocation pattern in a terrestrial network.

In an example, hexagon 722 of allocation pattern 720 is the coverage area of a first beam of NTNBS 620, whereas hexagon 732 of allocation pattern 730 is the first cell of TNBS 602.

In some aspects, cells of TNBSs, such as TNBS 602, in the TN have a fixed relationship (e.g., fixed geographical relationship) with respect to the coverage areas of beams of NTNBSs, such as NTNBSs 620, of the NTN. For example, NTNBS 620 can be geostationary, such as a high earth orbit satellite, such that the coverage area of NTNBS 620 does not change with respect to the rotation of the earth as the orbit of the NTNBS 620 is geosynchronous with the rotation of the earth. Accordingly, in certain aspects the NT entity 630 may semi-statically send frequency allocation information of the NTN to TN entity 640, as the frequency allocation to beams of the NTNBS 620 may not change with the rotation of the earth. The FCBs assigned to beams of the NTNBS 620 may be changed sometimes, such as for other reasons, and accordingly, NT entity 630 may send updated frequency allocation information to TN entity 640.

In some examples, the coverage areas of the plurality of beams of the NTNBS 620 correspond to and fully overlap with the plurality of cells of the TNBS 602. For example, hexagon 722 and hexagon 732 can cover the same geographical area, and hexagon 724 and hexagon 734 can cover the same geographical area. Accordingly, to minimize interference during communication in the geographical area represented by hexagon 722 and hexagon 732, the NTNBS 620 and the TNBS 602 may be configured to communicate using different FCBs. For example, the NTNBS 620 may communicate with a UE in hexagon 722 over a first FCB, such as f2. Further, the TNBS 602 may communicate with another UE in hexagon 732 over a second FCB, such as f4. Similarly, the NTNBS 620 may communicate with a UE in hexagon 724 over f3, while the TNBS 602 may communicate with another UE in hexagon 734 over f1.

Though not shown, as discussed, in certain aspects the coverage area of a beam of NTNBS 620 and a cell of TNBS 602 may only partially overlap, such as due to size differences, or an offset in location (e.g., offset in center). For example, a single beam may overlap with a plurality of cells in coverage area, or a single cell may overlap in coverage area with a plurality of beams. Where multiple beams overlap with a single cell, TNBS 602 may be configured to use a different FCB than the FCBs of each of the multiple beams.

In certain aspects an allocation pattern is a repeating pattern, such that the pattern can be extended over a larger geographical area. For example, frequency allocation information may include an indication of an instance of a repeating pattern that is then repeated over a larger geographical area than the single instance of the repeating pattern.

Aspects Related to Changing Relationship Between Beams and Cells

Figure 8:
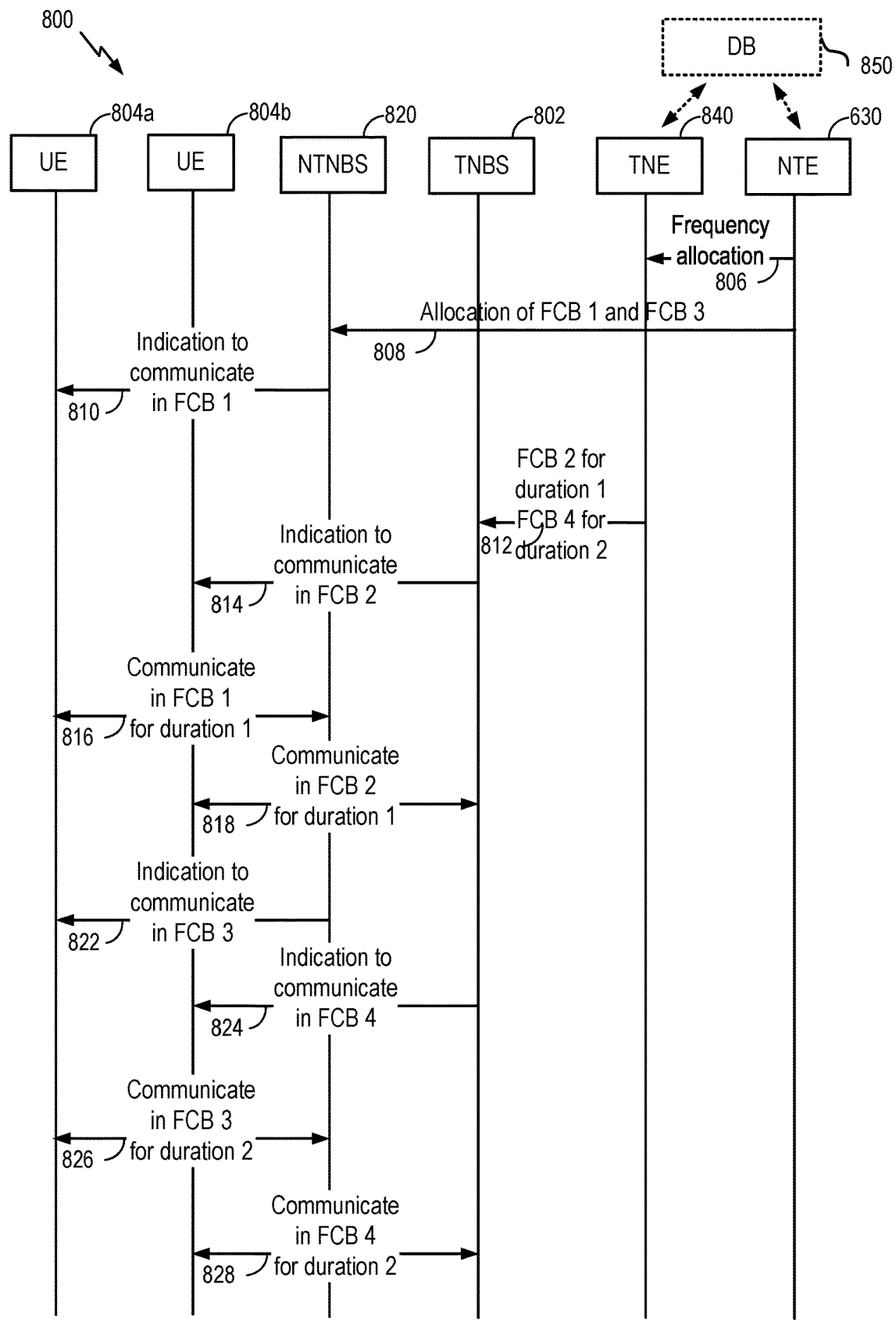
FIG. 8 depicts a process flow for spectrum sharing between a NTN and a TN.

FIG. 8 depicts a process flow 800 for spectrum sharing between a NTN and a TN. In some aspects, NTNBS 820 is an example of NTNBS 520 depicted and described with respect to FIG. 5, TNBS 802 is an example of BS 102 described with respect to FIG. 1, and UEs 804a and 804b are examples of UE 104 described with respect to FIG. 1. Further, NT entity 830 is an example of a network entity of the NTN, and TN entity 840 is an example of a network entity of the TN. In certain aspects, NT entity 830 is a separate device from NTNBS 820. In certain aspects, NT entity 830 is NTNBS 820. In certain aspects, TN entity 840 is a separate device from TNBS 802. In certain aspects, TN entity 840 is TNBS 802. FIG. 8 describes two separate UEs, one communicating with NTNBS 820, and another communicating with TNBS 802, it should be noted that in certain aspects a single UE can communicate with both NTNBS 820 and TNBS 802. Accordingly, in certain aspects, a single UE may perform the actions of both UE 804a and UE 804b discussed with respect to FIG. 8. At 806, NT entity 830 sends to TN entity 840, frequency allocation information. In certain aspects, NT entity 830 sends the frequency allocation information to TN entity 840 directly. In certain aspects, NT entity 830 sends the frequency allocation information to TN entity 840 indirectly, such as via a database 850 (e.g., a third party database controlled by neither the network operator of the NTN nor the TN).

The frequency allocation information may indicate information regarding which FCBs are used in which geographic locations in the NTN. In certain aspects, the frequency allocation information further indicates time periods during which FCBs are used in geographical locations in the NTN. For example, in some aspects, cells of TNBSs, such as TNBS 802, in the TN have a changing relationship (e.g., changing geographical relationship) with respect to the coverage areas of beams of NTNBSs, such as NTNBSs 820, of the NTN. For example, NTNBS 820 can be non-geostationary, such as a low earth orbit satellite, such that the coverage area of NTNBS 820 changes with respect to the rotation of the earth as the orbit of the NTNBS 820. For example, beams of NTNBS 820 may move over time with respect to a surface of the earth, such that during a first time period, a first beam of NTNBS 820 overlaps in coverage area with a first cell of TNBS 802. Further, in the example, during a second time period, the first beam no longer overlaps in coverage area with the first cell, but a second beam of NTNBS 820 overlaps in coverage area with the first cell. Accordingly, the frequency allocation information may indicate this changing relationship. Thus, based on the frequency allocation information, the TN entity 840 can determine which FCBs are used in a cell of TNBS 802 during which time period, and therefore indicate to a UE in the cell to communicate using different FCBs during different time periods, to avoid interference.

In certain aspects, the frequency allocation information indicates an allocation pattern, such as discussed, and one or more of a trajectory or a velocity of the NTNBS 820. Based on such frequency allocation information, TNBS 802 can determine which FCBs are used in which beams of NTNBS 820, and further determine a changing coverage area of each beam with respect to cells of the TN. For example, TNBS 802 may determine that a first frequency channel band is used in a beam of NTNBS 820 that overlaps with the cell of TNBS 802 during a first time period, and that a third frequency channel band is used in a beam of NTNBS 820 that overlaps with the cell of TNBS 802 during a second time period.

In certain aspects, the frequency allocation information may indicate such a changing relationship in another suitable manner, such as explicitly indicating which FCBs are used in which geographical areas for which time periods. In certain aspects, the frequency allocation information indicates a first allocation pattern for a first time period and a second allocation pattern for a second time period. In certain aspects, the first allocation pattern or the second allocation pattern identifies, for each of a plurality of beams of the NTNBS 820, a corresponding one or more FCBs. For example, the first allocation pattern may identify a first FCB for a first beam of the plurality of beams for the first duration and the second allocation pattern may identify a FCB different from the first FCB (e.g., a third FCB) for the first beam of the plurality of beams for the second duration.

At 808, NT entity 830 sends to NTNBS 820 an indication to use one or more FCBs for one or more beams of NTNBS 820. For example, in certain aspects, the indication indicates to use the first FCB for a first beam of the NTNBS 820, and to use the third FCB for a second beam of the NTNBS 820.

At 810, prior to a first time period, NTNBS 820 indicates to UE 804a, which may be a UE in the coverage area of the first beam of NTNBS 820 during the first time period, an indication to use the first FCB for communication. The UE 804a may be in the coverage area of the second beam of NTNBS 820 during a second time period.

At 812, TN entity 840 sends to TNBS 802 an indication to use one or more FCBs for one or more cells of TNBS 802 for one or more time periods. For example, the indication may indicate for TNBS 802 to use a second FCB (e.g., the third FCB or another FCB different than the first FCB) for communication in a first cell of TNBS 802 during the first time period, and to use a fourth FCB (e.g., the first FCB or another FCB different than the third FCB) for communication in the first cell during the second time period. For example, the coverage are of the first beam of NTNBS 820 may overlap with the coverage area of the first cell during the first time period, and the coverage are of the second beam of NTNBS 820 may overlap with the coverage area of the first cell during the second time period. Accordingly, the TN entity 840 may indicate to TNBS 802 to use different one or more FCBs in the first cell during the first time period than one or more FCBs used by NTNBS 820 in one or more beams that overlap in coverage area with the first cell during the first time period, and may indicate to TNBS 802 to use different one or more FCBs in the first cell during the second time period than one or more FCBs used by NTNBS 820 in one or more beams that overlap in coverage area with the first cell during the second time period.

For example, the TN entity 840, based on receiving the frequency allocation information at 806 from NT entity 830, can determine that the first cell of TNBS 802 overlaps in coverage area with the first beam of NTNBS 820 during the first time period and with the second beam of NTNBS 820 during the second time period. Further, the TN entity 840 can determine that the first FCB is used by NTNBS 820 for communication over the first beam, and the third FCB is used by NTNBS 820 for communication over the second beam. Accordingly, to avoid interference with the NTN communications during the first time period, the TN entity 840 may determine to use a FCB different from the first FCB for communication in the first cell for the first time period (e.g., and different from any other FCBs that NT entity 830 may use in beams that overlap with the first cell during the first time period). Similarly, to avoid interference with the NTN communications during the second time period, the TN entity 840 may determine to use a FCB different from the third FCB for communication in the first cell for the second time period (e.g., and different from any other FCBs that NT entity 830 may use in beams that overlap with the first cell during the second time period). Since the first cell overlaps in coverage area with the first beam, the frequency allocation information may also be referred to as indicating that NTNBS 820 uses the first FCB for the first time period and the third FCB for the second time period for communication in the first cell.

At 814, prior to the first time period, TNBS 802 indicates to UE 804*b*, which may be a UE in the coverage area of the first cell of TNBS 802, an indication to use the second FCB for communication.

At 816, UE 804*a* communicates (e.g., receives downlink signals), during the first time period, with NTNBS 820 using the first FCB indicated by NTNBS 820. At 818, UE 804*b* communicates (e.g., receives downlink signals), during the first time period, with TNBS 802 using the second FCB indicated by TNBS 802.

At 822, before the second time period (e.g., at an end of the first time period), NTNBS 820 indicates to UE 804*a* an indication to use the third FCB for communication. For example, during the second time period, UE 804*a* may be in a coverage area of the second beam instead of the first beam of NTNBS 820. In some examples, the third FCB is the same as the second FCB.

At 824, before the second time period (e.g., at an end of the first time period), TNBS 802 indicates to UE 804*b* an indication to use the fourth FCB for communication.

At 826, UE 804*a* communicates with NTNBS 820, during the second time period, using the third FCB. At 826, UE 804*b* communicates with TNBS 802, during the second time period, using the fourth FCB indicated by TNBS 802.

Example Operations of a Network Entity

Figure 9:
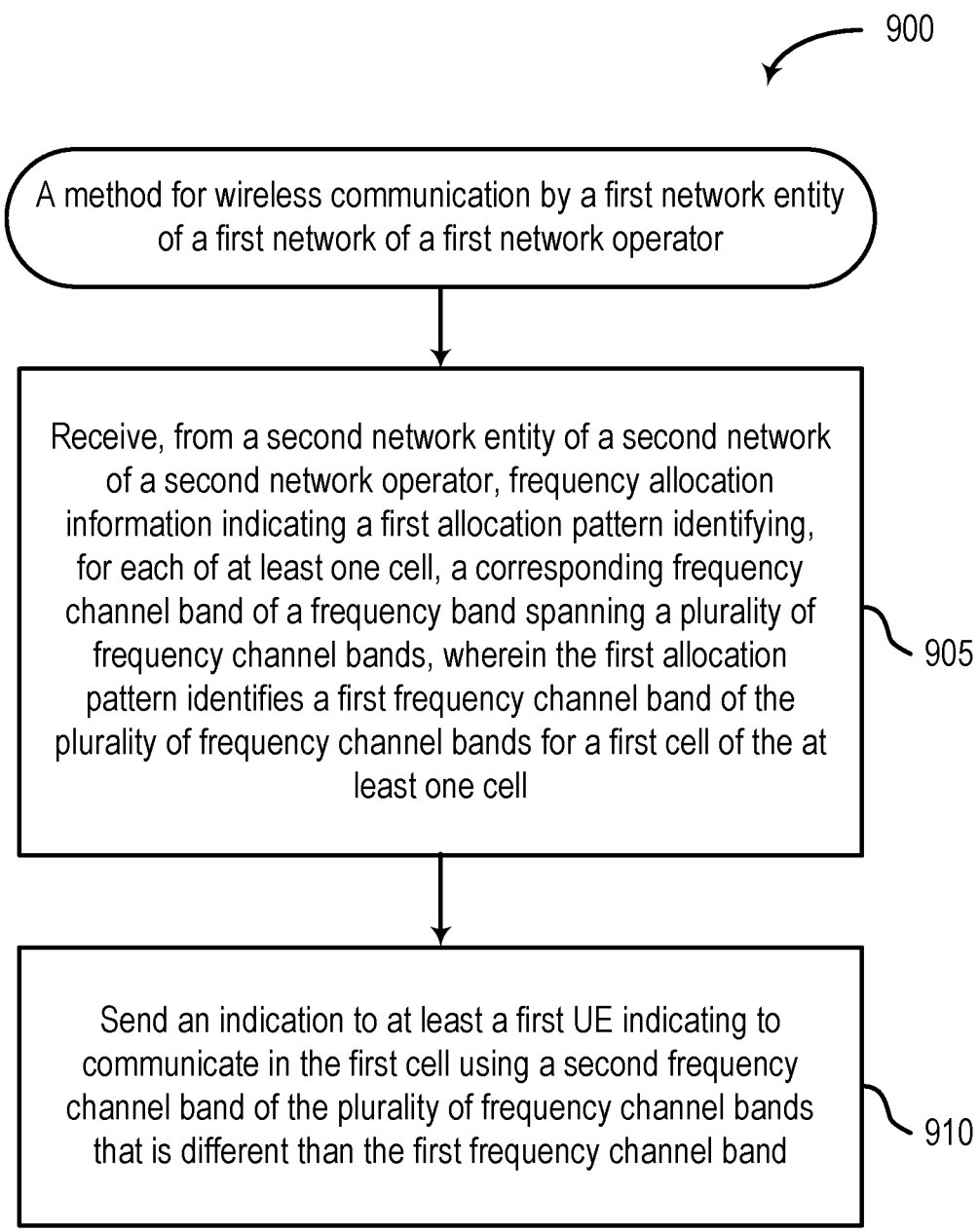
FIG. 9 depicts a method for wireless communications.

FIG. 9 shows an example of a method 900 for wireless communications by a first network entity of a first network of a first network operator, such as by a BS 102 of FIGS. 1 and 3, or a disaggregated base station as discussed with respect to FIG. 2.

Method 900 begins at step 905 with receiving, from a second network entity of a second network of a second network operator, frequency allocation information indicating a first allocation pattern identifying, for each of at least one cell (e.g., a plurality of cells), a corresponding frequency channel band of a frequency band spanning a plurality of frequency channel bands, wherein the first allocation pattern identifies a first frequency channel band of the plurality of frequency channel bands for a first cell of the at least one cell. In some cases, the operations of this step refer to, or may be performed by, circuitry for receiving and/or code for receiving as described with reference to FIG. 11.

Method 900 then proceeds to step 910 with sending an indication to at least a first UE indicating to communicate in the first cell using a second frequency channel band of the plurality of frequency channel bands that is different than the first frequency channel band. In some cases, the operations of this step refer to, or may be performed by, circuitry for sending and/or code for sending as described with reference to FIG. 11.

In some aspects, the first network is a terrestrial network, and wherein the second network is a non-terrestrial network.

In some aspects, the frequency allocation information comprises an index value that maps to the first allocation pattern, wherein a plurality of index values map to a plurality of allocation patterns.

In some aspects, receiving the frequency allocation information comprises receiving the frequency allocation information from the second network entity via a database accessible by the second network entity and the first network entity.

In some aspects, the plurality of cells are cells of the first network; the second network has a plurality of beams having a fixed relationship with the plurality of cells; and the frequency allocation information identifying, for each of the plurality of cells, the corresponding frequency channel band comprises the frequency allocation information identifying, for each of the plurality of beams, the corresponding frequency channel band.

In some aspects, the plurality of cells are cells of the first network; the second network has a plurality of beams having a changing relationship with the plurality of cells; and the frequency allocation information identifying, for each of the plurality of cells, the corresponding frequency channel band comprises the frequency allocation information identifying, for each of the plurality of beams, the corresponding frequency channel band.

In some aspects, the frequency allocation information identifies one or more of a trajectory or a velocity of a BS of the second network.

In some aspects, the first allocation pattern identifies the first frequency channel band for the first cell for a first time period, and wherein the first allocation pattern identifies a third frequency channel band of the plurality of frequency channel bands for the first cell for a second time period.

In some aspects, the indication indicates to communicate in the first cell using the second frequency channel band during the first time period.

In some aspects, the method 900 further includes sending another indication to at least the first UE indicating to communicate, during the second time period, in the first cell using a fourth frequency channel band of the plurality of frequency channel bands that is different than the third frequency channel band. In some cases, the operations of this step refer to, or may be performed by, circuitry for sending and/or code for sending as described with reference to FIG. 11.

In some aspects, the third frequency channel band is the second frequency channel band.

Figure 11:
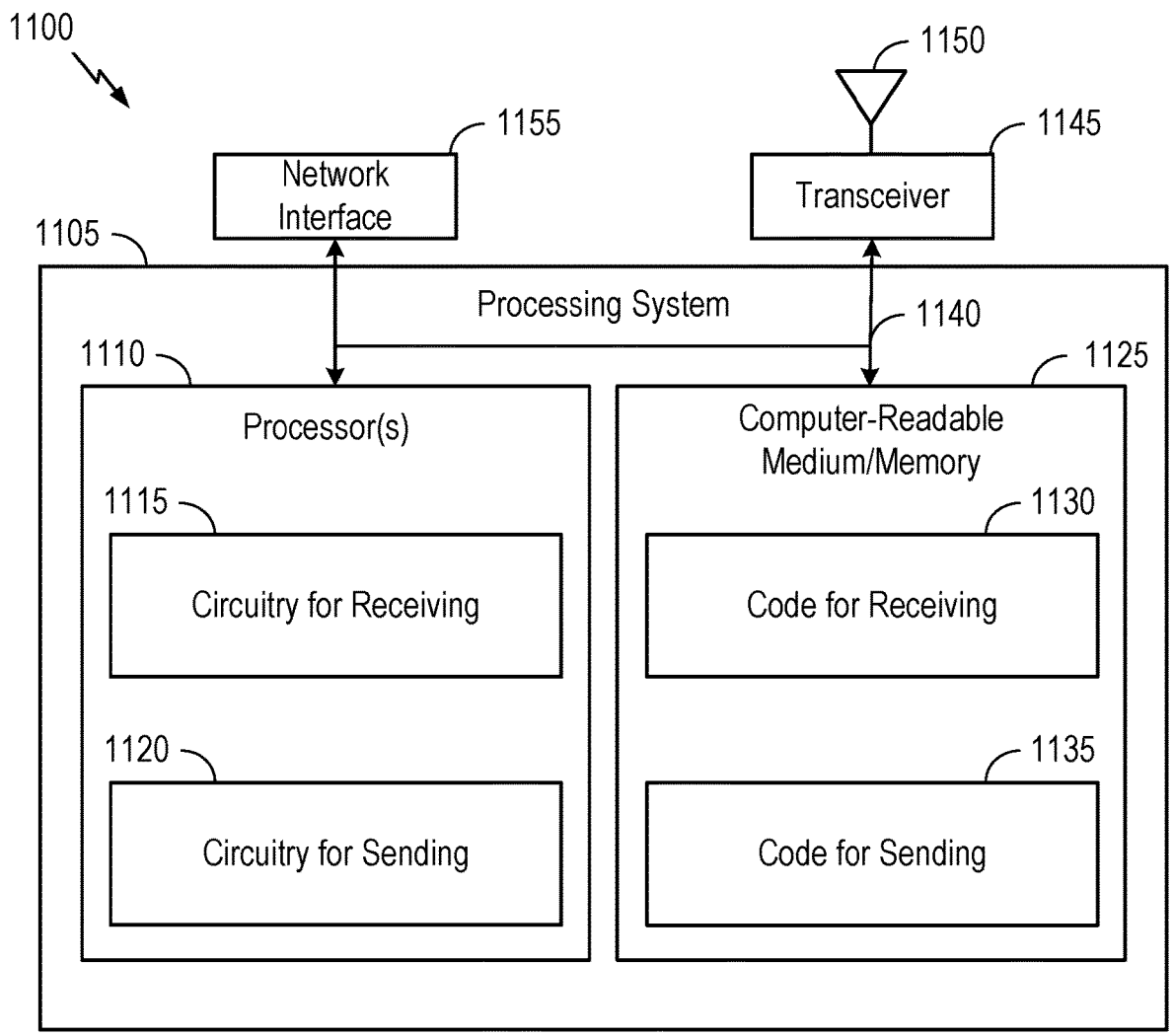
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
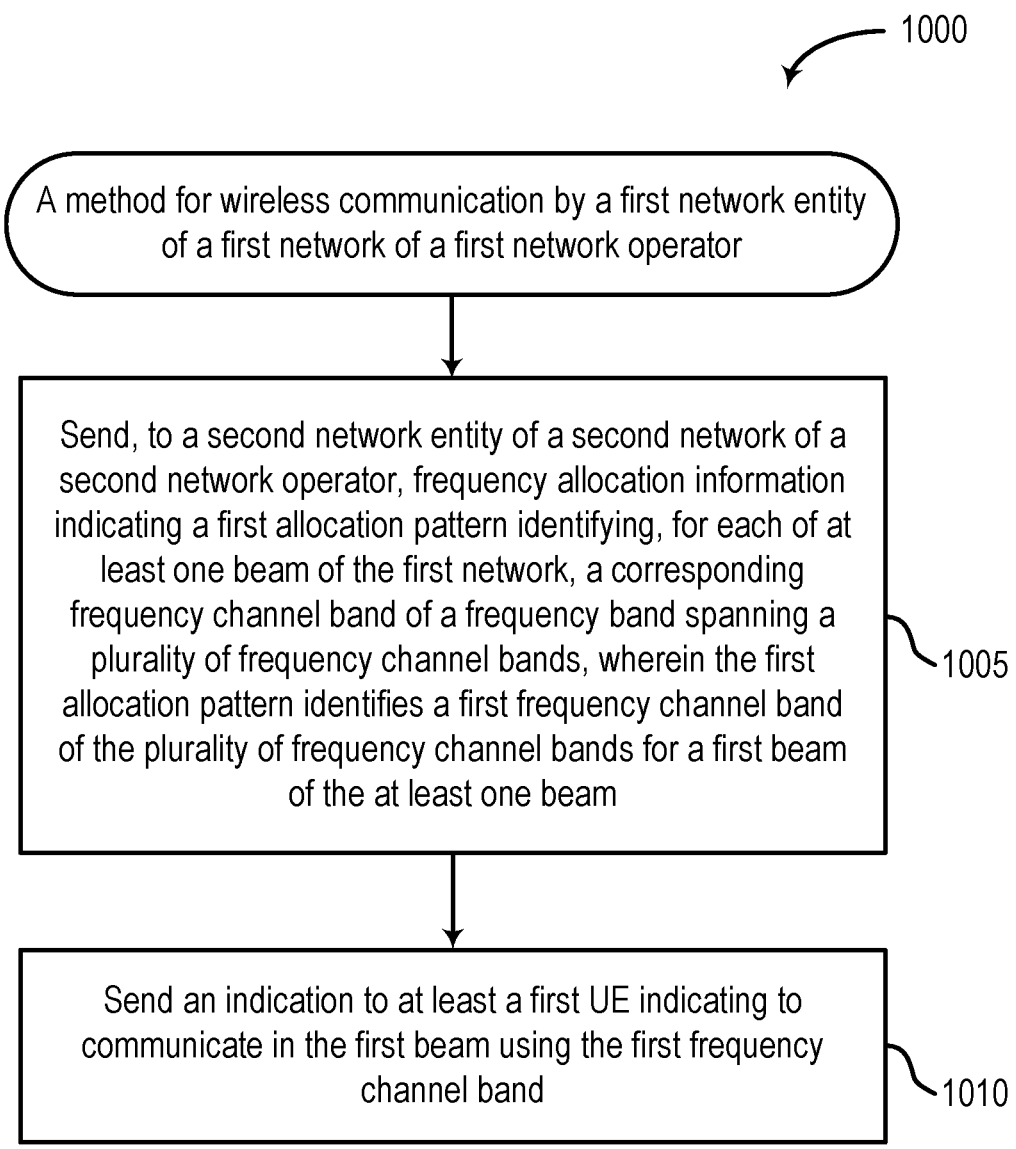
FIG. 10 depicts a method for wireless communications.

FIG. 10 shows an example of a method 1000 for wireless communications by a first network entity of a first network of a first network operator, such as by a BS 102 of FIGS. 1 and 3, or a disaggregated base station as discussed with respect to FIG. 2.

Method 1000 begins at step 1005 with sending, to a second network entity of a second network of a second network operator, frequency allocation information indicating a first allocation pattern identifying, for each of at least one beam (e.g., a plurality of beams) of the first network, a corresponding frequency channel band of a frequency band spanning a plurality of frequency channel bands, wherein the first allocation pattern identifies a first frequency channel band of the plurality of frequency channel bands for a first beam of the at least one beam. In some cases, the operations of this step refer to, or may be performed by, circuitry for sending and/or code for sending as described with reference to FIG. 11.

Method 1000 then proceeds to step 1010 with sending an indication to at least a first UE indicating to communicate in the first beam using the first frequency channel band. In some cases, the operations of this step refer to, or may be performed by, circuitry for sending and/or code for sending as described with reference to FIG. 11.

In some aspects, the first network is a non-terrestrial network, and wherein the second network is a terrestrial network.

In some aspects, the frequency allocation information comprises an index value that maps to the first allocation pattern, wherein a plurality of index values map to a plurality of allocation patterns.

In some aspects, sending the frequency allocation information comprises sending the frequency allocation information to the second network entity via a database accessible by the second network entity and the first network entity.

In some aspects, the second network has a plurality of cells having a fixed relationship with the plurality of beams; and the frequency allocation information identifying, for each of the plurality of beams, the corresponding frequency channel band comprises the frequency allocation information identifying, for each of the plurality of cells, the corresponding frequency channel band.

In some aspects, the second network has a plurality of cells having a changing relationship with the plurality of beams; and the frequency allocation information identifying, for each of the plurality of beams, the corresponding frequency channel band comprises the frequency allocation information identifying, for each of the plurality of cells, the corresponding frequency channel band.

In some aspects, the frequency allocation information identifies one or more of a trajectory or a velocity of a BS of the first network.

In some aspects, the first allocation pattern identifies the first frequency channel band for a first cell of the plurality of cells for a first time period, and wherein the first allocation pattern identifies a second frequency channel band of the plurality of frequency channel bands for the first cell for a second time period.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1145 (e.g., a transmitter and/or a receiver) and/or a network interface 1155. The transceiver 1145 is configured to transmit and receive signals for the communications device 1100 via the antenna 1150, such as the various signals as described herein. The network interface 1155 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code) that when executed by the one or more processors 1110, cause the one or more processors 1110 to perform the method 900 described with respect to FIG. 9, or any aspect related to it, and/or the method 1000 described with respect to FIG. 10, or any aspect related to it. Note that reference to a processor of communications device 1100 performing a function may include one or more processors 1110 of communications device 1100 performing that function.

In the depicted example, the computer-readable medium/memory 1125 stores code (e.g., executable instructions), such as code for receiving 1130 and code for sending 1135. Processing of the code for receiving 1130 and code for sending 1135 may cause the communications device 1100 to perform the method 900 described with respect to FIG. 9, or any aspect related to it, and/or the method 1000 described with respect to FIG. 10, or any aspect related to it.

The one or more processors 1110 include circuitry configured to implement (e.g., execute) the code stored in the computer-readable medium/memory 1125, including circuitry such as circuitry for receiving 1115 and circuitry for sending 1120. Processing with circuitry for receiving 1115 and circuitry for sending 1120 may cause the communications device 1100 to perform the method 900 as described with respect to FIG. 9, or any aspect related to it, and/or the method 1000 described with respect to FIG. 10, or any aspect related to it.

Various components of the communications device 1100 may provide means for performing the method 900 as described with respect to FIG. 9, or any aspect related to it, and/or the method 1000 described with respect to FIG. 10, or any aspect related to it. Means for transmitting, sending or outputting for transmission may include transceivers 332 and/or antenna(s) 334 of the BS 102 illustrated in FIG. 3 and/or the transceiver 1145 and the antenna 1150 of the communications device 1100 in FIG. 11. Means for receiving or obtaining may include transceivers 332 and/or antenna(s) 334 of the BS 102 illustrated in FIG. 3 and/or the transceiver 1145 and the antenna 1150 of the communications device 1100 in FIG. 11.

Example Clauses

Implementation examples are described in the following numbered clauses:

Clause 1: A method for wireless communication by a first network entity of a first network of a first network operator, comprising: receiving, from a second network entity of a second network of a second network operator, frequency allocation information indicating a first allocation pattern identifying, for each of at least one cell, a corresponding frequency channel band of a frequency band spanning a plurality of frequency channel bands, wherein the first allocation pattern identifies a first frequency channel band of the plurality of frequency channel bands for a first cell of the at least one cell; and sending an indication to at least a first UE indicating to communicate in the first cell using a second frequency channel band of the plurality of frequency channel bands that is different than the first frequency channel band.

Clause 2: The method of Clause 1, wherein the first network is a terrestrial network, and wherein the second network is a non-terrestrial network.

Clause 3: The method of any one of Clauses 1 and 2, wherein the frequency allocation information comprises an index value that maps to the first allocation pattern, wherein a plurality of index values map to a plurality of allocation patterns.

Clause 4: The method of any one of Clauses 1-3, wherein receiving the frequency allocation information comprises receiving the frequency allocation information from the second network entity via a database accessible by the second network entity and the first network entity.

Clause 5: The method of any one of Clauses 1-4, wherein: the at least once cell comprises a plurality of cells that are cells of the first network; the second network has a plurality of beams having a fixed relationship with the plurality of cells; and the frequency allocation information identifying, for each of the plurality of cells, the corresponding frequency channel band comprises the frequency allocation information identifying, for each of the plurality of beams, the corresponding frequency channel band.

Clause 6: The method of any one of Clauses 1-5, wherein: the at least once cell comprises a plurality of cells that are cells of the first network; the second network has a plurality of beams having a changing relationship with the plurality of cells; and the frequency allocation information identifying, for each of the plurality of cells, the corresponding frequency channel band comprises the frequency allocation information identifying, for each of the plurality of beams, the corresponding frequency channel band.

Clause 7: The method of Clause 6, wherein the frequency allocation information identifies one or more of a trajectory or a velocity of a BS of the second network.

Clause 8: The method of Clause 6, wherein the first allocation pattern identifies the first frequency channel band for the first cell for a first time period, and wherein the first allocation pattern identifies a third frequency channel band of the plurality of frequency channel bands for the first cell for a second time period.

Clause 9: The method of Clause 8, wherein the indication indicates to communicate in the first cell using the second frequency channel band during the first time period.

Clause 10: The method of Clause 9, further comprising: sending another indication to at least the first UE indicating to communicate, during the second time period, in the first cell using a fourth frequency channel band of the plurality of frequency channel bands that is different than the third frequency channel band.

Clause 11: The method of Clause 10, wherein the third frequency channel band is the second frequency channel band.

Clause 12: A method for wireless communication by a first network entity of a first network of a first network operator, comprising: sending, to a second network entity of a second network of a second network operator, frequency allocation information indicating a first allocation pattern identifying, for each of at least one beam of the first network, a corresponding frequency channel band of a frequency band spanning a plurality of frequency channel bands, wherein the first allocation pattern identifies a first frequency channel band of the plurality of frequency channel bands for a first beam of the at least one beam; and sending an indication to at least a first UE indicating to communicate in the first beam using the first frequency channel band.

Clause 13: The method of Clause 12, wherein the first network is a non-terrestrial network, and wherein the second network is a terrestrial network.

Clause 14: The method of any one of Clauses 12 and 13, wherein the frequency allocation information comprises an index value that maps to the first allocation pattern, wherein a plurality of index values map to a plurality of allocation patterns.

Clause 15: The method of any one of Clauses 12-14, wherein sending the frequency allocation information comprises sending the frequency allocation information to the second network entity via a database accessible by the second network entity and the first network entity.

Clause 16: The method of any one of Clauses 12-15, wherein: the at least one beam comprises a plurality of beams; the second network has a plurality of cells having a fixed relationship with the plurality of beams; and the frequency allocation information identifying, for each of the plurality of beams, the corresponding frequency channel band comprises the frequency allocation information identifying, for each of the plurality of cells, the corresponding frequency channel band.

Clause 17: The method of any one of Clauses 12-16, wherein: the at least one beam comprises a plurality of beams; the second network has a plurality of cells having a changing relationship with the plurality of beams; and the frequency allocation information identifying, for each of the plurality of beams, the corresponding frequency channel band comprises the frequency allocation information identifying, for each of the plurality of cells, the corresponding frequency channel band.

Clause 18: The method of Clause 17, wherein the frequency allocation information identifies one or more of a trajectory or a velocity of a BS of the first network.

Clause 19: The method of Clause 17, wherein the first allocation pattern identifies the first frequency channel band for a first cell of the plurality of cells for a first time period, and wherein the first allocation pattern identifies a second frequency channel band of the plurality of frequency channel bands for the first cell for a second time period.

Clause 20: An apparatus, comprising: a memory comprising executable instructions; and a processor configured to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by a processor of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first network entity of a first network of a first network operator configured for wireless communication, comprising: a memory comprising computer-executable instructions; and one or more processors configured to execute the computer-executable instructions and cause the first network entity to:
   receive, from a second network entity of a second network of a second network operator, frequency allocation information indicating a first allocation pattern identifying, for each of at least one cell, a corresponding frequency channel band of a frequency band spanning a plurality of frequency channel bands, wherein the first allocation pattern identifies a first frequency channel band of the plurality of frequency channel bands for a first cell of the at least one cell; and
   send an indication to at least a first user equipment (UE) indicating to communicate in the first cell using a second frequency channel band of the plurality of frequency channel bands that is different than the first frequency channel band.

2. The first network entity of claim 1, wherein the first network is a terrestrial network, and wherein the second network is a non-terrestrial network.

3. The first network entity of claim 1, wherein the frequency allocation information comprises an index value that maps to the first allocation pattern, wherein a plurality of index values map to a plurality of allocation patterns.

4. The first network entity of claim 1, wherein the processor configured to cause the first network entity to receive the frequency allocation information is configured to cause the first network entity to receive the frequency allocation information from the second network entity via a database accessible by the second network entity and the first network entity.

5. The first network entity of claim 1, wherein:
   the at least one cell comprises a plurality of cells that are cells of the first network;
   the second network has a plurality of beams having a fixed relationship with the plurality of cells; and
   the frequency allocation information identifying, for each of the plurality of cells, the corresponding frequency channel band comprises the frequency allocation information identifying, for each of the plurality of beams, the corresponding frequency channel band.

6. The first network entity of claim 1, wherein:
   the at least one cell comprises a plurality of cells that are cells of the first network;
   the second network has a plurality of beams having a changing relationship with the plurality of cells; and the frequency allocation information identifying, for each of the plurality of cells, the corresponding frequency channel band comprises the frequency allocation information identifying, for each of the plurality of beams, the corresponding frequency channel band.

7. The first network entity of claim 6, wherein the frequency allocation information identifies one or more of a trajectory or a velocity of a base station (BS) of the second network.

8. The first network entity of claim 6, wherein the first allocation pattern identifies the first frequency channel band for the first cell for a first time period, and wherein the first allocation pattern identifies a third frequency channel band of the plurality of frequency channel bands for the first cell for a second time period.

9. The first network entity of claim 8, wherein the indication indicates to communicate in the first cell using the second frequency channel band during the first time period.

10. The first network entity of claim 9, wherein the one or more processors are configured to execute the computer-executable instructions and further cause the first network entity to send another indication to at least the first UE indicating to communicate, during the second time period, in the first cell using a fourth frequency channel band of the plurality of frequency channel bands that is different than the third frequency channel band.

11. The first network entity of claim 10, wherein the third frequency channel band is the second frequency channel band.

12. A first network entity of a first network of a first network operator configured for wireless communication, comprising: a memory comprising computer-executable instructions; and one or more processors configured to execute the computer-executable instructions and cause the first network entity to:
send, to a second network entity of a second network of a second network operator, frequency allocation information indicating a first allocation pattern identifying, for each of at least one beam of the first network, a corresponding frequency channel band of a frequency band spanning a plurality of frequency channel bands, wherein the first allocation pattern identifies a first frequency channel band of the plurality of frequency channel bands for a first beam of the at least one beam; and
send an indication to at least a first user equipment (UE) indicating to communicate in the first beam using the first frequency channel band.

13. The first network entity of claim 12, wherein the first network is a non-terrestrial network, and wherein the second network is a terrestrial network.

14. The first network entity of claim 12, wherein the frequency allocation information comprises an index value that maps to the first allocation pattern, wherein a plurality of index values map to a plurality of allocation patterns.

15. The first network entity of claim 12, wherein the processor configured to cause the first network entity to send the frequency allocation information is configured to cause the first network entity to send the frequency allocation information to the second network entity via a database accessible by the second network entity and the first network entity.

16. The first network entity of claim 12, wherein:
the at least one beam comprises a plurality of beams;
the second network has a plurality of cells having a fixed relationship with the plurality of beams; and
the frequency allocation information identifying, for each of the plurality of beams, the corresponding frequency channel band comprises the frequency allocation information identifying, for each of the plurality of cells, the corresponding frequency channel band.

17. The first network entity of claim 12, wherein:
the at least one beam comprises a plurality of beams;
the second network has a plurality of cells having a changing relationship with the plurality of beams; and
the frequency allocation information identifying, for each of the plurality of beams, the corresponding frequency channel band comprises the frequency allocation information identifying, for each of the plurality of cells, the corresponding frequency channel band.

18. The first network entity of claim 17, wherein the frequency allocation information identifies one or more of a trajectory or a velocity of a base station (BS) of the first network.

19. The first network entity of claim 17, wherein the first allocation pattern identifies the first frequency channel band for a first cell of the plurality of cells for a first time period, and wherein the first allocation pattern identifies a second frequency channel band of the plurality of frequency channel bands for the first cell for a second time period.

20. A method for wireless communication by a first network entity of a first network of a first network operator, comprising:
receiving, from a second network entity of a second network of a second network operator, frequency allocation information indicating a first allocation pattern identifying, for each of a at least one cell, a corresponding frequency channel band of a frequency band spanning a plurality of frequency channel bands, wherein the first allocation pattern identifies a first frequency channel band of the plurality of frequency channel bands for a first cell of the at least one cell; and
sending an indication to at least a first user equipment (UE) indicating to communicate in the first cell using a second frequency channel band of the plurality of frequency channel bands that is different than the first frequency channel band.

21. The method of claim 20, wherein the first network is a terrestrial network, and wherein the second network is a non-terrestrial network.

22. The method of claim 20, wherein the frequency allocation information comprises an index value that maps to the first allocation pattern, wherein a plurality of index values map to a plurality of allocation patterns.

23. The method of claim 20, wherein receiving the frequency allocation information comprises receiving the frequency allocation information from the second network entity via a database accessible by the second network entity and the first network entity.

24. The method of claim 20, wherein:
the at least one cell comprises a plurality of cells that are cells of the first network;
the second network has a plurality of beams having a fixed relationship with the plurality of cells; and
the frequency allocation information identifying, for each of the plurality of cells, the corresponding frequency channel band comprises the frequency allocation information identifying, for each of the plurality of beams, the corresponding frequency channel band.

25. The method of claim 20, wherein:
the at least one cell comprises a plurality of cells that are cells of the first network;

the second network has a plurality of beams having a changing relationship with the plurality of cells; and the frequency allocation information identifying, for each of the plurality of cells, the corresponding frequency channel band comprises the frequency allocation information identifying, for each of the plurality of beams, the corresponding frequency channel band.

26. A method for wireless communication by a first network entity of a first network of a first network operator, comprising:

sending, to a second network entity of a second network of a second network operator, frequency allocation information indicating a first allocation pattern identifying, for each of at least one beam of the first network, a corresponding frequency channel band of a frequency band spanning a plurality of frequency channel bands, wherein the first allocation pattern identifies a first frequency channel band of the plurality of frequency channel bands for a first beam of the at least one beam; and sending an indication to at least a first user equipment (UE) indicating to communicate in the first beam using the first frequency channel band.

27. The method of claim 26, wherein the frequency allocation information comprises an index value that maps to the first allocation pattern, wherein a plurality of index values map to a plurality of allocation patterns.

28. The method of claim 26, wherein sending the frequency allocation information comprises sending the frequency allocation information to the second network entity via a database accessible by the second network entity and the first network entity.

29. The method of claim 26, wherein:

the at least one beam comprises a plurality of beams;

the second network has a plurality of cells having a fixed relationship with the plurality of beams; and the frequency allocation information identifying, for each of the plurality of beams, the corresponding frequency channel band comprises the frequency allocation information identifying, for each of the plurality of cells, the corresponding frequency channel band.

30. The method of claim 26, wherein:

the at least one beam comprises a plurality of beams;

the second network has a plurality of cells having a changing relationship with the plurality of beams; and the frequency allocation information identifying, for each of the plurality of beams, the corresponding frequency channel band comprises the frequency allocation information identifying, for each of the plurality of cells, the corresponding frequency channel band.

* * * * *